(12) United States Patent
Yokogawa et al.

(10) Patent No.: US 11,383,588 B2
(45) Date of Patent: Jul. 12, 2022

(54) VEHICLE SIDE STRUCTURE

(71) Applicant: MAZDA MOTOR CORPORATION, Hiroshima (JP)

(72) Inventors: Junya Yokogawa, Hiroshima (JP); Yoshihiko Horita, Higashihiroshima (JP); Daisuke Nakazato, Hiroshima (JP); Tomoki Takahashi, Hiroshima (JP); Ishii Shoki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 638 days.

(21) Appl. No.: 16/446,182

(22) Filed: Jun. 19, 2019

(65) Prior Publication Data

US 2019/0390491 A1    Dec. 26, 2019

(30) Foreign Application Priority Data

Jun. 25, 2018 (JP) .............................. JP2018-119697

(51) Int. Cl.
 B60J 5/04 (2006.01)
 B62D 25/02 (2006.01)
 (Continued)

(52) U.S. Cl.
 CPC ........... B60J 5/0458 (2013.01); B60J 5/0427 (2013.01); E05B 77/02 (2013.01); E05C 3/004 (2013.01);
 (Continued)

(58) Field of Classification Search
 CPC ....... B62D 25/04; B62D 25/025; E05B 79/04; E05B 85/045; E05B 77/02
 (Continued)

(56) References Cited

U.S. PATENT DOCUMENTS

| 4,307,911 | A |   | 12/1981 | Pavlik |
|---|---|---|---|---|
| 5,083,969 | A | * | 1/1992 | Wagener ................. A63H 17/26 446/87 |
| 5,306,067 | A | * | 4/1994 | Hull ....................... B60J 5/0458 296/202 |

FOREIGN PATENT DOCUMENTS

| CN | 201597419 U | * | 10/2010 | ............ B60J 5/0479 |
|---|---|---|---|---|
| DE | 2028249 B1 |   | 3/1972 | |

(Continued)

OTHER PUBLICATIONS

The extended European search report issued by the European Patent Office on Nov. 20, 2019, which corresponds to European U.S. Appl. No. 16/446,182 -1005 and is related to U.S. Appl. No. 16/446,182.

*Primary Examiner* — Dennis H Pedder
(74) *Attorney, Agent, or Firm* — Studebaker & Brackett PC

(57) ABSTRACT

The present application prevents an engaging pin or a catcher pin from damaging an upper surface of a side sill or a lower surface of a side door when the door is closed, and reduces a height of the side sill over which an occupant steps when getting into a vehicle. A vehicle side structure includes an engaging portion that is at least partially provided between a lower part of a side door and a side sill and provides engagement between the lower part and the side sill. The engaging portion includes an engaging pin provided to protrude from an upper surface of the side sill, and a catcher pin that is provided in the lower part of the side door, receives the engaging pin brought into a space above the lower part of the side door, and engages a tip of the engaging pin.

5 Claims, 9 Drawing Sheets

(51) Int. Cl.
*E05C 3/00* (2006.01)
*E05C 19/00* (2006.01)
*E05B 77/02* (2014.01)
*B62D 25/04* (2006.01)

(52) U.S. Cl.
CPC ............ *E05C 19/00* (2013.01); *B62D 25/025* (2013.01); *B62D 25/04* (2013.01)

(58) Field of Classification Search
USPC ....................... 296/209, 146.9, 146.6, 187.12
See application file for complete search history.

(56) References Cited

FOREIGN PATENT DOCUMENTS

| | | |
|---|---|---|
| DE | 3103580 A1 | 1/1982 |
| FR | 1511947 A | 2/1968 |
| FR | 2996171 A1 | 4/2014 |
| JP | S57-192817 U1 | 12/1982 |
| JP | 2004-148877 A | 5/2004 |

\* cited by examiner

VEHICLE SIDE STRUCTURE

BACKGROUND

The present application relates to a vehicle side structure provided between a lower part of a side door and a side sill and including an engaging portion that provides engagement between the lower part and the side sill.

Such a known engaging portion includes an engaging pin and an engaging pin receiving portion that receives the engaging pin and engages a tip of the engaging pin. For example, as exemplified in FIG. 3 of Japanese Patent Laid-Open No. 2003-11778, an engaging portion is known in which an engaging pin is provided to protrude downward from a side door lower surface, an engaging pin receiving portion is provided on a side sill upper surface, and the engaging pin receiving portion and the tip of the engaging pin are engaged between the side door lower surface and the side sill upper surface when the door is closed to ensure support rigidity of a seat belt provided on a front door.

Besides the engaging portion provided to ensure support rigidity of the seat belt on the front door as in Japanese Patent Laid-Open No. 2003-11778, an engaging portion is also known provided to prevent a side door from entering a vehicle interior at the time of lateral collision of a vehicle.

In either case, the conventional engaging portions are configured so that the engaging pin provided to protrude downward from the side door lower surface and the engaging pin receiving portion provided on the side sill upper surface are engaged between the side door lower surface and the side sill upper surface.

However, with such a configuration, if a gap between the side door lower surface and the side sill upper surface is too small, the tip of the engaging pin may interfere with the side sill upper surface to damage the side sill upper surface or the engaging pin receiving portion may interfere with the side door lower surface to damage the side door lower surface when the door is closed.

On the other hand, if the gap between the side door lower surface and the side sill upper surface is large, a rising portion rising from the side sill upper surface on which the engaging pin receiving portion is disposed needs to have a large height so as to close the gap from an inner side in a vehicle width direction, or vehicle interior side. This may require an occupant's effort to step over the side sill when getting into the vehicle.

The present application has been made in view of such problems, and has an object to provide a vehicle side structure that can prevent the engaging pin or the engaging pin receiving portion from damaging the side sill upper surface or the side door lower surface when the door is closed, and reduce a height of the side sill over which the occupant steps when getting into the vehicle.

SUMMARY

The present application provides a vehicle side structure including: a side door; a side sill located below the side door; and an engaging portion that provides engagement between a lower part of the side door and the side sill, the engaging portion including: an engaging pin provided to protrude upward from an upper surface of the side sill and having a tip with an increased diameter; and an engaging pin receiving portion that is provided in the lower part of the side door and receives the engaging pin brought into a space above the lower part of the side door, the engaging pin receiving portion being adapted to receive the engaging pin brought into the space above the lower part of the side door without interference when the door is closed, and to release the engaging pin without interference when the door is opened, the tip of the engaging pin engaging the engaging pin receiving portion at least at the time of lateral collision.

According to the above described configuration, the side door can be prevented from entering a vehicle interior at the time of lateral collision without any influence on opening and closing the door. Further, at that time, the engaging pin can be prevented from damaging the upper surface of the side sill or the engaging pin receiving portion can be prevented from damaging a lower surface of the side door, and the lower surface of the side door can be lowered.

As an aspect of the present application, a striker is provided adjacent to the engaging portion to protrude upward from the upper surface of the side sill, and a door latch is provided in the lower part of the side door, the door latch being adapted to engage the striker when the door is closed.

According to the above described configuration, the engaging portion brought into pin engagement and a door latch engaging portion brought into latch engagement at the time of lateral collision of the vehicle can be provided adjacent to each other and cooperate to receive a lateral collision load.

As an aspect of the present application, the door latch engaging portion including the door latch and the striker is provided farther from a door hinge of the side door than the engaging portion.

According to the above described configuration, positioning performance of the side door can be improved by latch engagement of the door latch engaging portion when the door is closed.

As an aspect of the present application, the vehicle side structure further includes a base plate for mounting a latch body partially including the door latch to the lower part of the side door, the base plate is expanded to the engaging pin receiving portion, and the engaging pin receiving portion is mounted to the base plate.

According to the above described configuration, the door latch and the engaging pin receiving portion can behave in the same manner at the time of lateral collision.

As an aspect of the present application, a vertical space between the door latch and the striker is set to be equal to a vertical space between the engaging pin and the engaging pin receiving portion.

According to the above described configuration, a load can be simultaneously applied to the engaging pin and the striker when the lower part of the side door moves upward at the time of lateral collision of the vehicle.

The present application can prevent the engaging pin or the engaging pin receiving portion from damaging the upper surface of the side sill or the lower surface of the side door when the door is closed, and reduce a height of the side sill over which an occupant steps when getting into the vehicle.

DETAILED DESCRIPTION

An embodiment of the present application will be described in detail with reference to the drawings.

Figure 2:
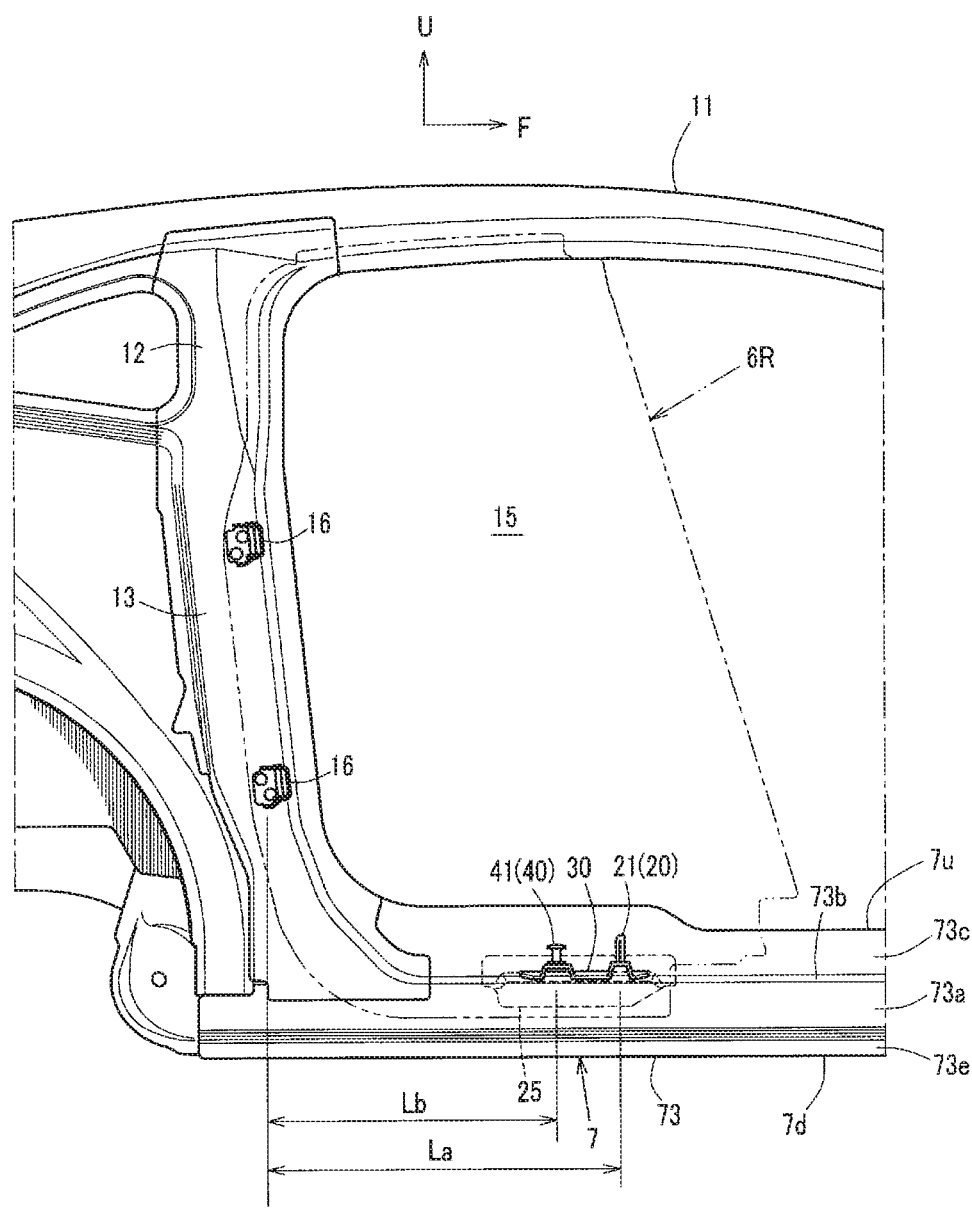
FIG. 2 is a right side view of the vehicle with a side door being removed.

In the drawings, an arrow F indicates a front side of a vehicle, an arrow R indicates a right side of the vehicle, an arrow L indicates a left side of the vehicle, an arrow U indicates an upper side of the vehicle, an arrow OUT indicates an outer side in a vehicle width direction, and an arrow IN indicates an inner side in the vehicle width direction. In FIGS. 2 and 7, a side door is not shown, in FIGS. 6, 8, and 9, a door outer panel and a center pillar are not shown.

A vehicle side structure of this embodiment is symmetrical, and a configuration on the right side of the vehicle will be described unless otherwise specified.

Figure 1:
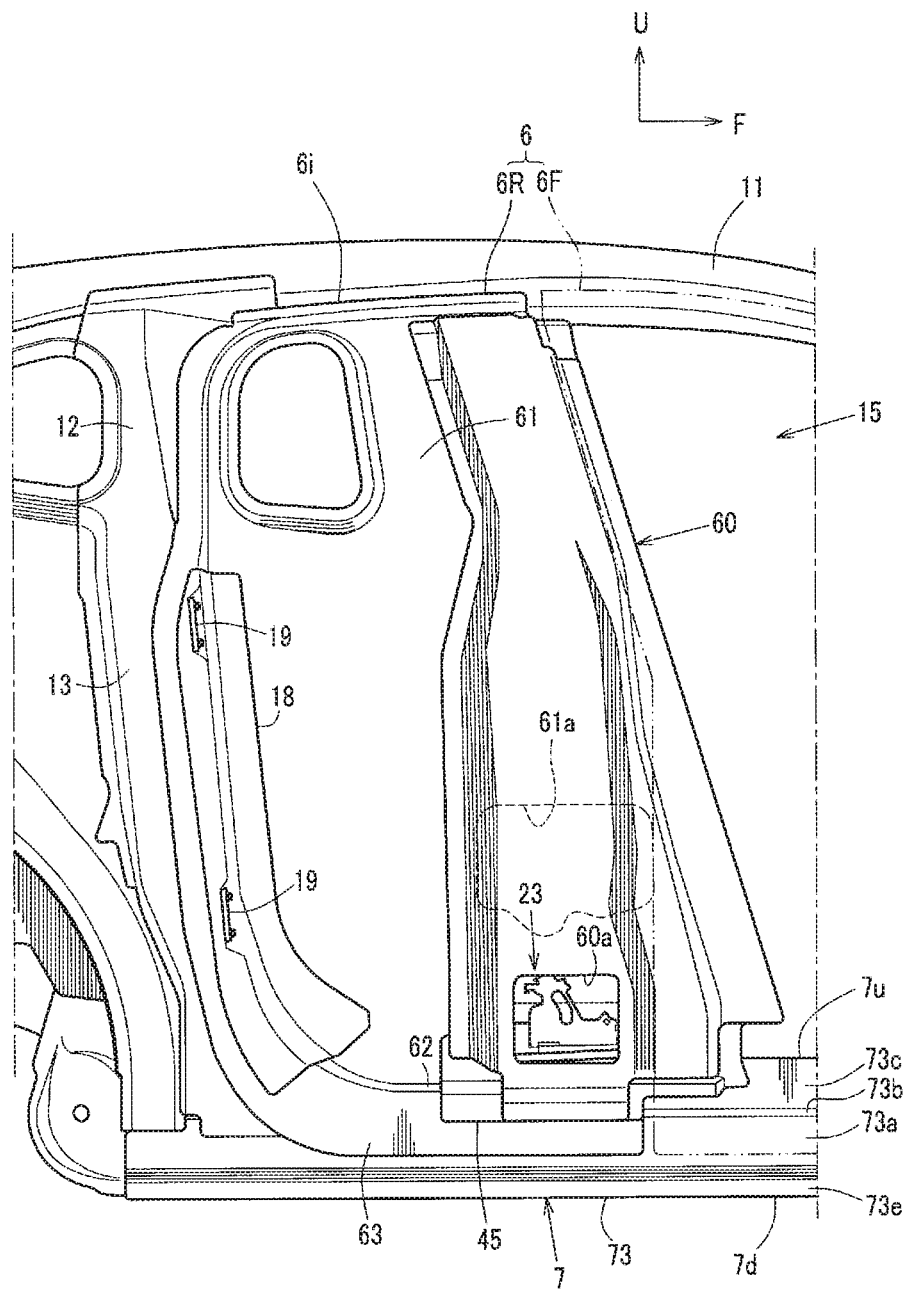
FIG. 1 is a right side view of a vehicle with a door outer panel being removed.

As shown in FIGS. 1 and 2, the vehicle side structure of this embodiment includes a door opening 15 surrounded by a roof side rail 11, a rear pillar 12, a rear body 13 extending downward continuously with the rear pillar 12, a side sill 7, and a hinge pillar and a front pillar (not shown) on the front side of the vehicle, and including no center pillar.

The door opening 15 is an entrance through which an occupant gets into and out of the vehicle, and includes a side door 6 including a front door 6F openably and closably mounted to a hinge pillar (not shown) on the front side of the vehicle via a pair of upper and lower door hinges (not shown) and a rear door 6R openably and closably mounted to the rear body 13 via a pair of upper and lower door hinges 16 as shown in FIG. 1. The side door 6, is a biparting door including the front door 6F and the rear door 6R.

Figure 3:
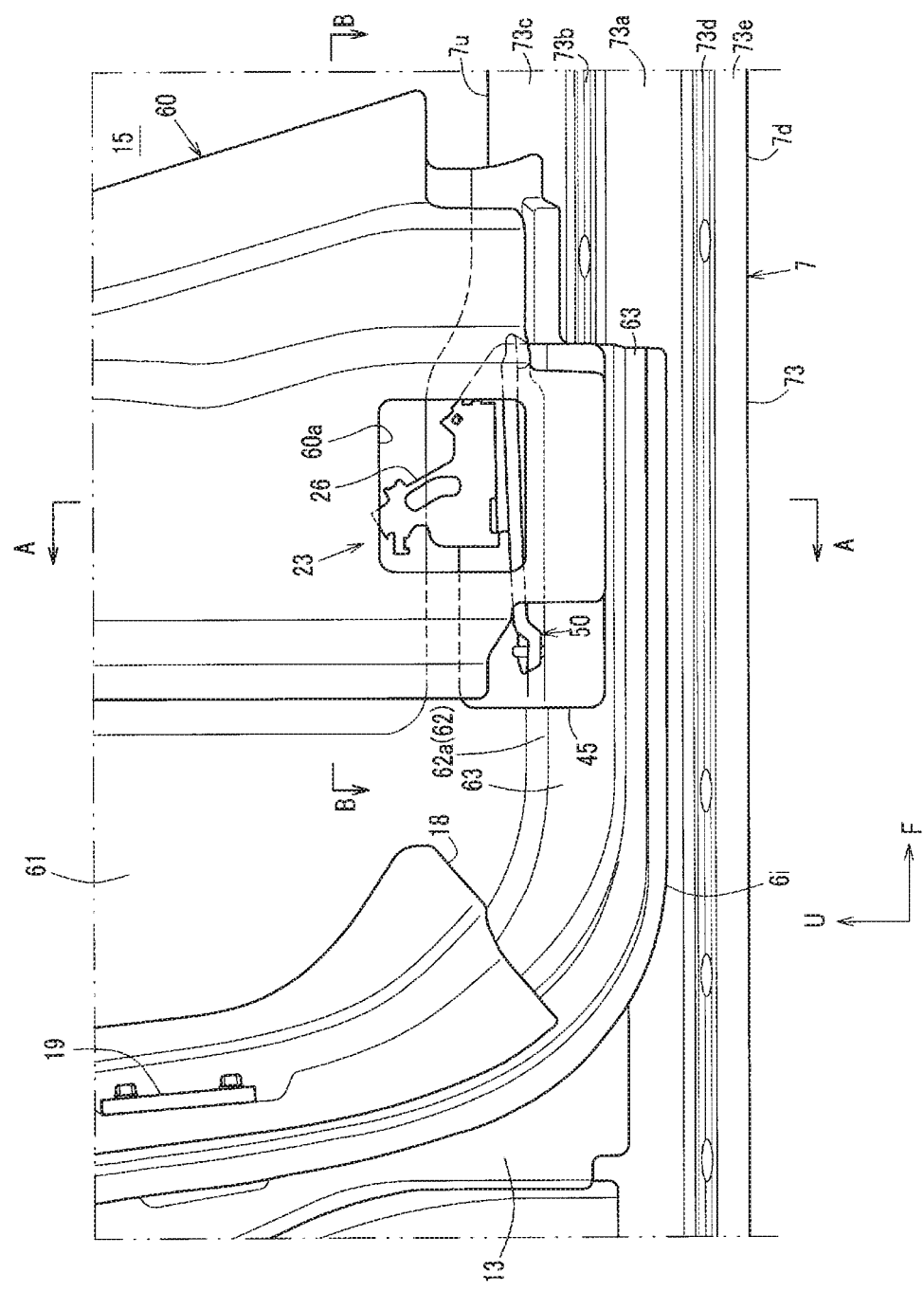
FIG. 3 is an enlarged view of FIG. 1.
Figure 4:
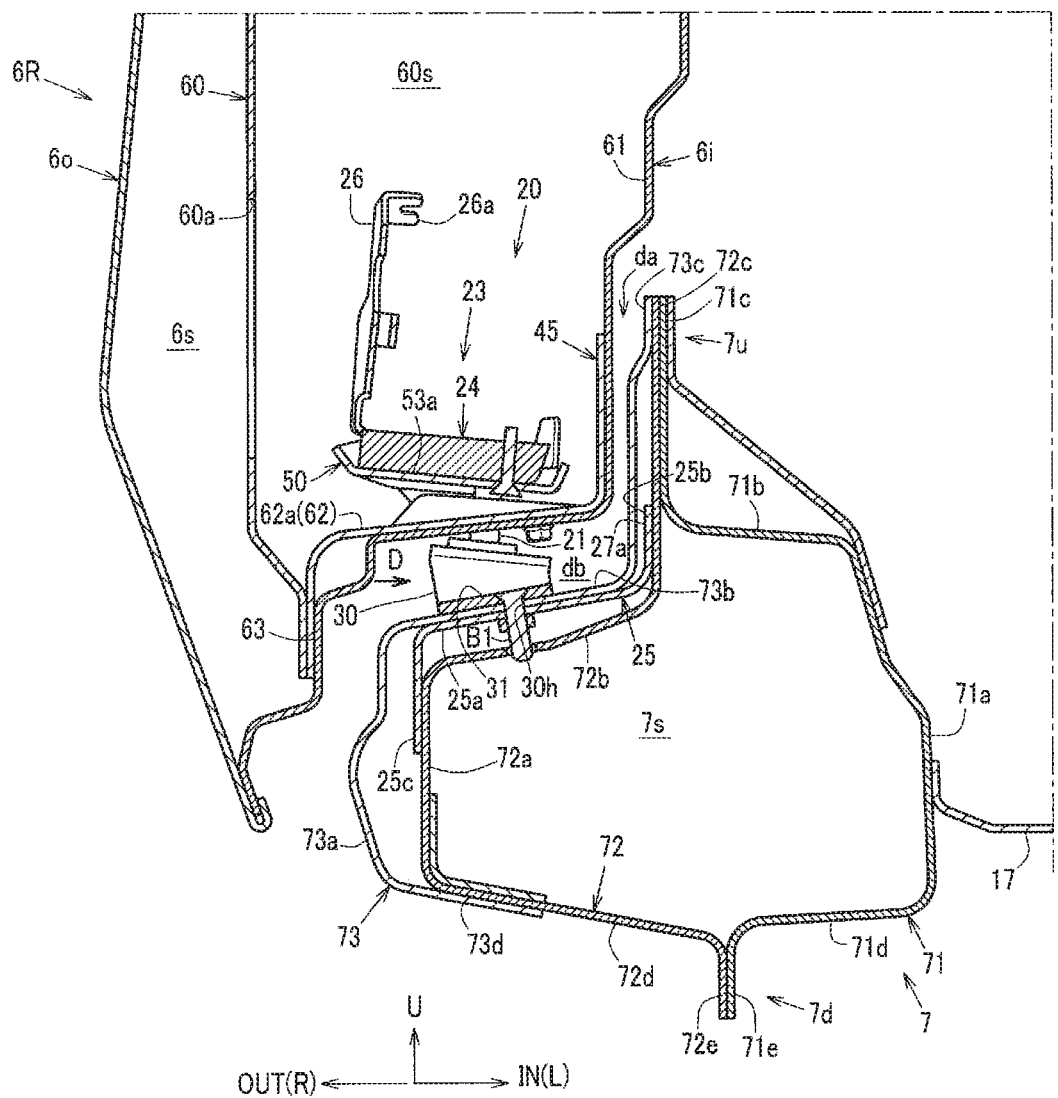
FIG. 4 is a sectional view taken in the direction of arrows A-A in FIG. 3.

As shown in FIG. 4, the side sill 7 is a vehicle body rigidity member that includes a side sill inner 71 having a substantially hat-shaped section protruding inward in the vehicle width direction in a section perpendicular to a front-rear direction of the vehicle, being the section taken in the direction of arrows A-A in FIG. 3, a side sill reinforcement 72 having a substantially hat-shaped section protruding outward in the vehicle width direction, and a side sill outer 73 provided on the outer side of the side sill reinforcement 72 in the vehicle width direction, forming an appearance design surface of the vehicle, and also having a substantially hat-shaped section protruding outward in the vehicle width direction, and has a side sill closed section 7s extending in the front-rear direction of the vehicle between the side sill inner 71 and the side sill reinforcement 72.

A floor panel 17 that forms a floor surface of a vehicle interior is laid between side sill inners 71 of a pair of left and right side sills 7 as shown in FIG. 4.

Describing the side sill 7 in detail, the side sill inner 71 integrally includes an inner side wall 71a extending substantially vertically in the section perpendicular to the front-rear direction of the vehicle, an inner upper wall 71b extending substantially outward in the vehicle width direction from an upper end of the inner side wall 71a, an inner upper end flange 71c extending substantially upward from an outer end of the inner upper wall 71b in the vehicle width direction, an inner lower wall 71d extending substantially outward in the vehicle width direction from a lower end of the inner side wall 71a, and an inner lower end flange 71e extending substantially downward from an outer end of the inner lower wall 71d in the vehicle width direction.

The side sill reinforcement 72 integrally includes a side wall 72a extending substantially vertically in the section perpendicular to the front-rear direction of the vehicle, an upper wall 72b extending substantially inward in the vehicle width direction from an upper end of the side wall 72a, an upper end flange 72c extending substantially upward from an inner end of the upper wall 72b in the vehicle width direction, a lower wall 72d extending substantially inward in the vehicle width direction from a lower end of the side wall 72a, and a lower end flange 72e extending substantially downward from an inner end of the lower wall 72d in the vehicle width direction.

The side sill outer 73 integrally includes an outer side wall 73a extending substantially vertically in the section perpendicular to the front-rear direction of the vehicle, an outer upper wall 73b extending substantially inward in the vehicle width direction from an upper end of the outer side wall 73a, an outer upper end flange 73c extending substantially upward from an inner end of the outer upper wall 73b in the vehicle width direction, and an outer lower wall 73d extending substantially inward in the vehicle width direction from a lower end of the outer side wall 73a.

The inner upper end flange 71c, the upper end flange 72c, and the outer upper end flange 73c are integrally joined by spot welding or the like so that the inner upper end flange 71c and the outer upper end flange 73c hold the upper end flange 72c therebetween, and the upper end flanges 71c, 72c, 73c constitute an upper flange 7u of the side sill 7.

In a region of the side sill 7 corresponding to the door opening 15 in the front-rear direction of the vehicle, a weather strip (not shown) is fitted into the upper flange 7u from above. In a region corresponding to, for example, the rear door 6R in the front-rear direction of the vehicle, a part of the weather strip provided between the upper flange 7u and a door inner panel body 61 described later is pressed against the upper flange 7u and a lower part of the rear door 6R, for example, the door inner panel body 61, that faces the upper flange 7u on the outer side in the vehicle width direction when the door is closed, thereby sealing between the upper flange 7u and the door inner panel body 61 (not shown).

As shown in FIG. 4, the inner lower end flange 71e and the lower end flange 72e are integrally joined by spot welding or the like, and the two lower end flanges 71e, 72e constitute a lower flange 7d of the side sill 7. The outer lower wall 73d is integrally joined to the lower wall 72d.

As shown in FIGS. 1 and 4, the rear door 6R includes a door inner panel 6i that is a panel member covering a rear part of the door opening 15, a door outer panel 6o as shown in FIG. 4 located on the outer side of the door inner panel 6i in the vehicle width direction and forming an appearance design surface of the vehicle, and a center pillar 60 built in the door and joined to the door inner panel 6i.

The door inner panel 6i integrally includes the door inner panel body 61 like a vertical wall extending vertically and in the front-rear direction of the vehicle so as to cover the door opening 15, a door lower wall 62 extending substantially outward in the vehicle width direction from a lower end of the door inner panel body 61, and a door downward extending portion 63 extending substantially downward from an outer end of the door lower wall 62 in the vehicle width direction as shown in FIG. 4.

Lower ends of the door downward extending portion 63 and the door outer panel 6o are integrated by hemming or the like.

Figure 5:
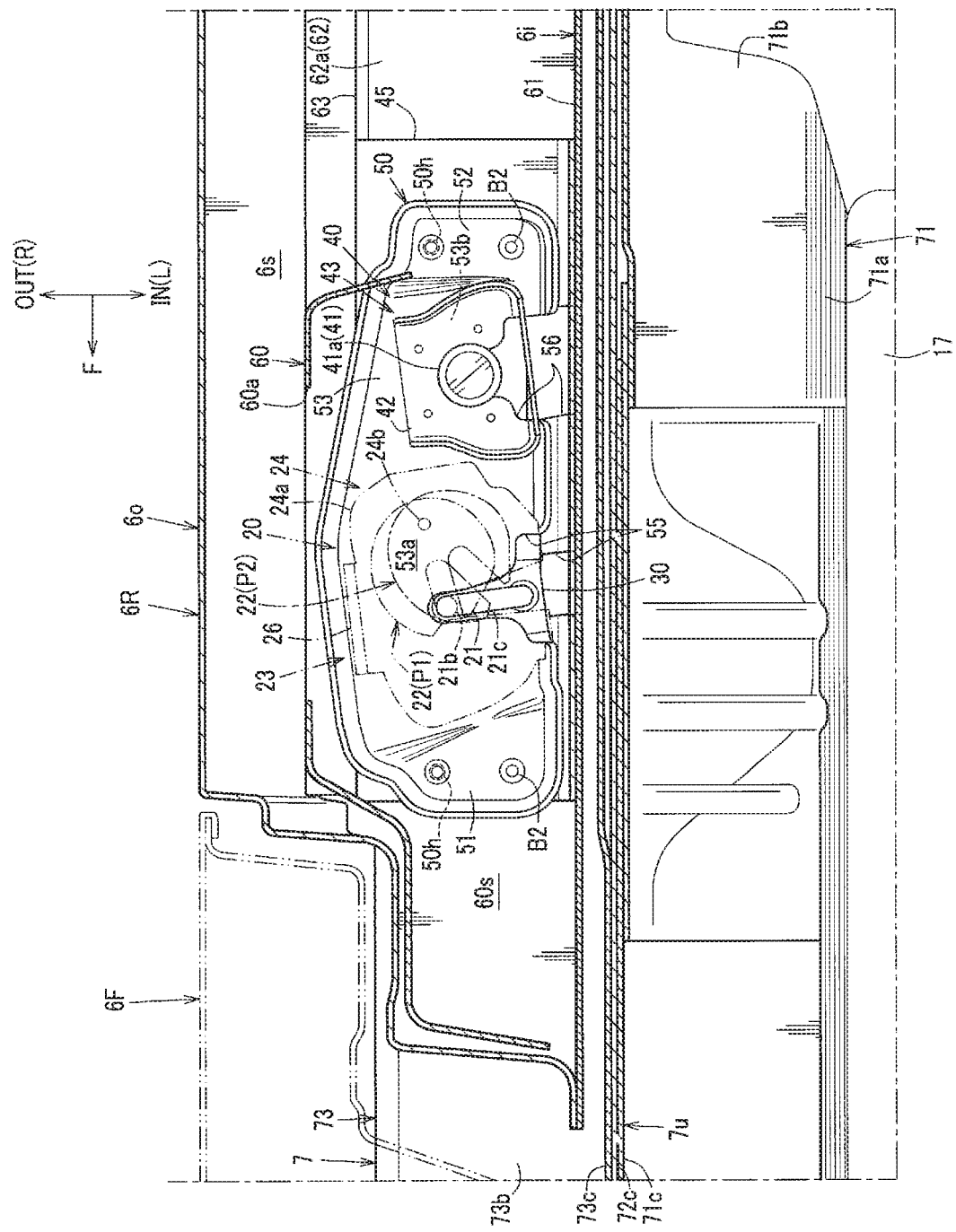
FIG. 5 is a sectional view taken in the direction of arrows B-B in FIG. 3.

As shown in FIGS. 4 and 5, a door internal space 6s is formed in the rear door 6R, such as between the door inner panel 6i and the door outer panel 6o and above the door lower wall 62 that forms a part of a bottom surface of the rear door 6R.

As shown in FIG. 1, a hinge reinforcement 18 extending vertically is mounted to a rear end of the door inner panel body 61 of the rear door 6R. The pair of upper and lower door hinges 16 as shown in FIG. 2 coupling the rear door 6R and the rear body 13 are mounted to the rear end of the door inner panel body 61 via a door side hinge bracket 19 as shown in FIG. 1 provided on the rear door 6R. The hinge reinforcement 18 reinforces a mounted part and therearound of the door side hinge bracket 19 at the rear end of the door inner panel body 61.

As shown in FIG. 4, when the door is closed, the lower part of the door inner panel body 61 faces the upper flange 7u of the side sill 7 with a gap da in the vehicle width direction therebetween, and the door lower wall 62 faces the outer upper wall 73b of the side sill 7 with a vertical gap db therebetween.

The upper flange 7u of the side sill 7 is provided to protrude upward from the outer upper wall 73b with such a height as to substantially close the vertical gap db between the outer upper wall 73b of the side sill 7 and the door lower wall 62 from the inner side in the vehicle width direction in a side view of the vehicle as shown by the view in the direction of arrow D in FIG. 4.

As shown in FIG. 1, the center pillar 60 extends vertically in a front position of the door inner panel body 61 of the rear door 6R with an increasing front-to-rear width toward a lower side along a front edge of the rear door 6R. Further, as shown in FIG. 5, the center pillar 60 has a substantially hat-shaped section protruding outward in the vehicle width direction in the section perpendicular to the vertical direction of the vehicle, and is joined to a surface of the door inner panel body 61 on the outer side in the vehicle width direction as shown in FIG. 1, thereby forming a center pillar closed section 60s extending vertically between the center pillar 60 and the door inner panel body 61 as shown in FIGS. 4 and 5.

As shown in FIGS. 1, 2, and 4, a lower end of the center pillar 60 is joined to the door downward extending portion 63 of the door inner panel 6i of the rear door 6R from the outer side in the vehicle width direction via a reinforcing panel 45 described later.

Figure 6:
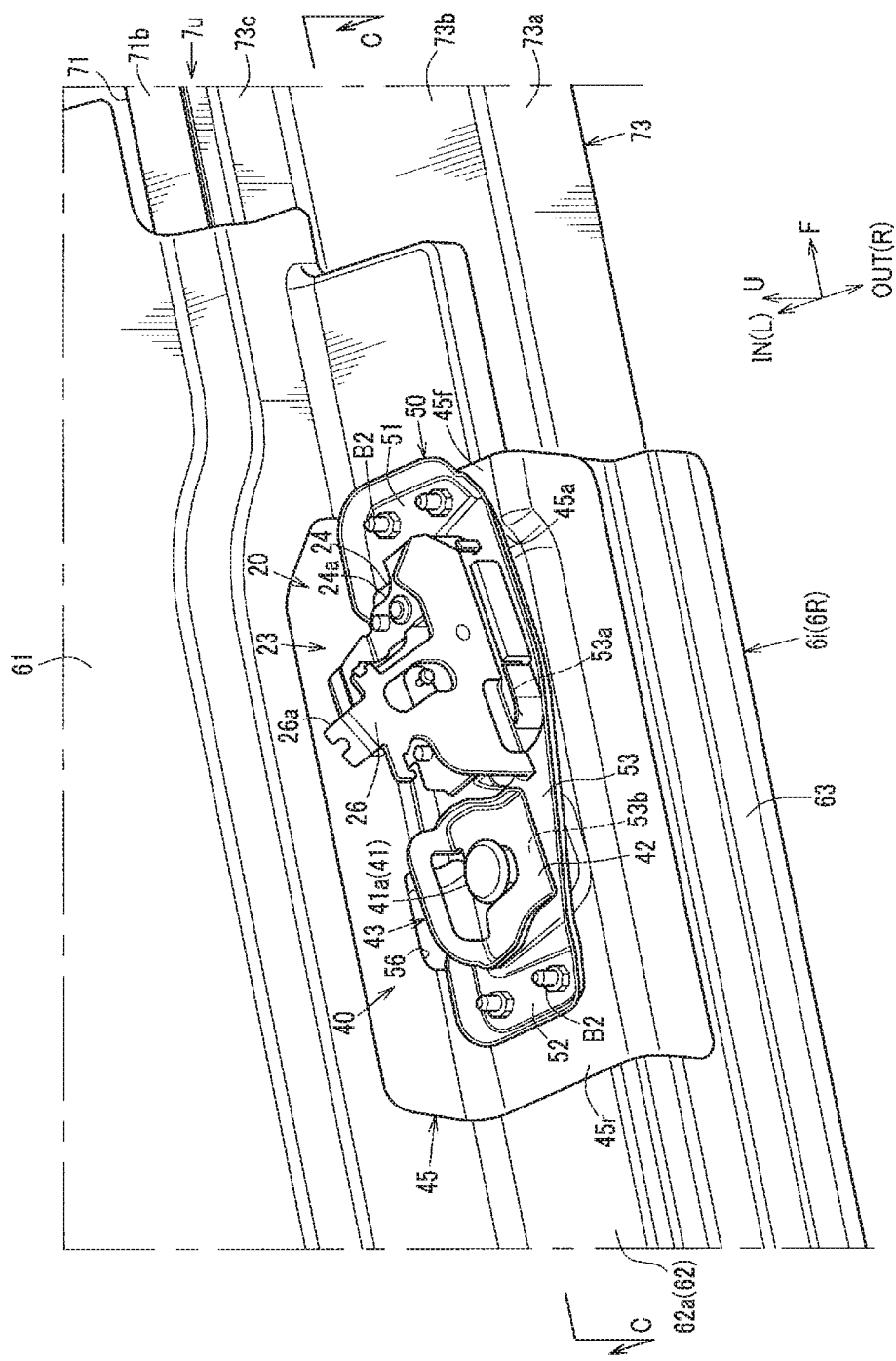
FIG. 6 is an enlarged perspective view of a door engaging portion and a stopper seen from a rear upper side and an outer side in a vehicle width direction.
Figure 7:
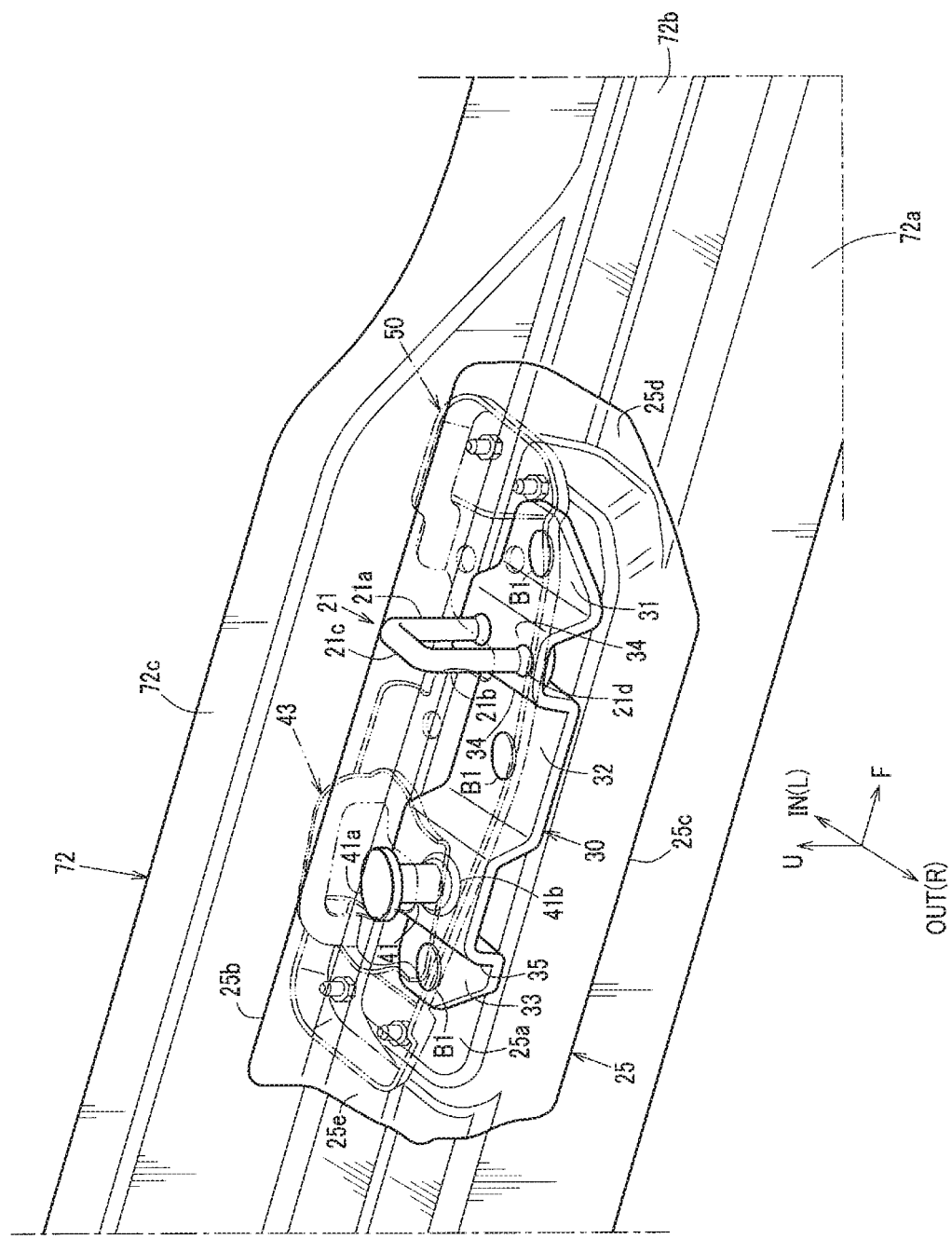
FIG. 7 is an enlarged perspective view of an engaging pin and a striker seen from a front upper side and the outer side in the vehicle width direction.
Figure 8:
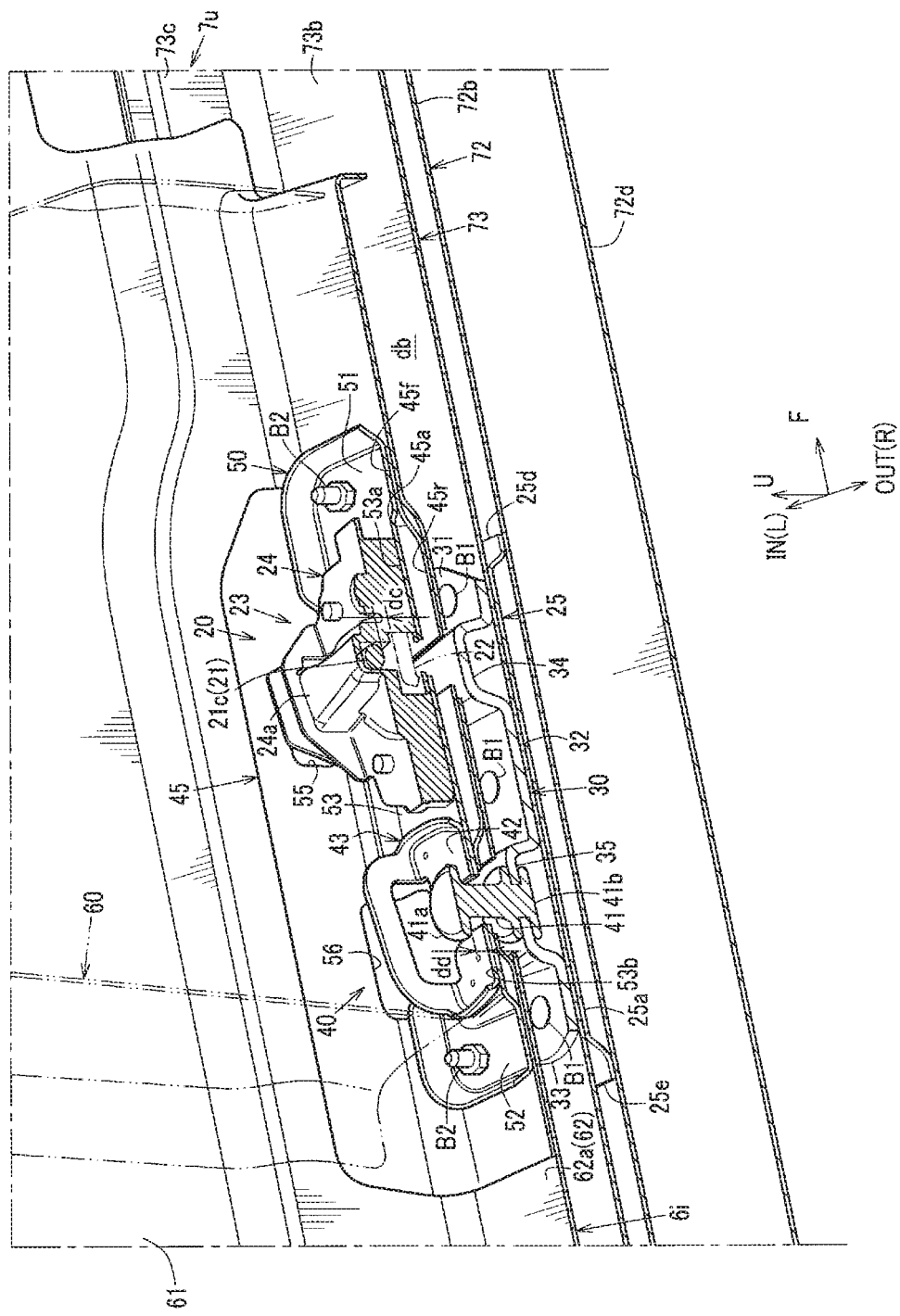
FIG. 8 is a sectional view taken in the direction of arrows C-C in FIG. 6.

As shown in FIGS. 6 and 8, in the lower part such as on the door lower wall 62 of the rear door 6R and on the side sill 7 facing the lower part on the lower side, a door engaging portion 20 and a stopper 40 that engage each other between the door lower wall 62 and the side sill 7 when the door is closed are provided adjacent to each other on the front and rear sides of the vehicle.

The door engaging portion 20 includes, as shown in FIGS. 2, 4, 5, 7 to 9, a striker 21 provided to protrude from an upper surface of the outer upper wall 73b, hereinafter also referred to as side sill upper surface 73b, of the side sill 7 of the vehicle body. As shown in FIGS. 5 and 8, a door latch 22 that is provided on an upper surface of the door lower wall 62, hereinafter referred to as door inner panel lower part upper surface 62a, at the lower part of the door inner panel 6i of the rear door 6R and engages the striker 21 when the door is closed.

Figure 9:
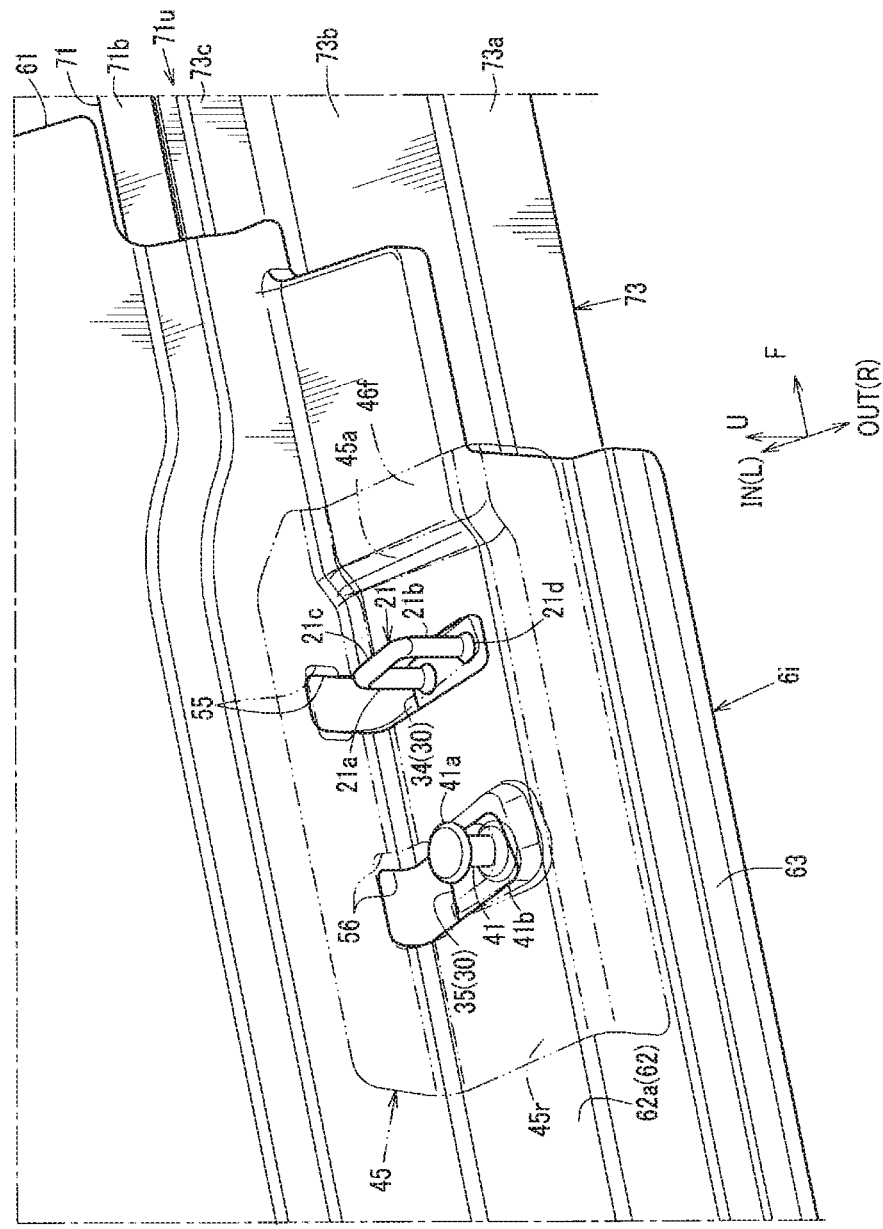
FIG. 9 is a perspective view of FIG. 6 with a latchet, an engaging pin receiving portion, and a base plate being omitted, and a reinforcing panel on a rear door being shown by a phantom line.

As shown in FIGS. 7 and 9, the striker 21 on the side sill 7 integrally includes a pair of cylindrical shafts 21a, 21b, or inner cylindrical shaft 21a and outer cylindrical shaft 21b, extending vertically from inner and outer sides in the vehicle width direction and a coupling shaft 21c that couples upper ends of the cylindrical shafts 21a, 21b in the vehicle width direction to form a substantially gate shape in a front view. As shown in FIGS. 5 and 8, the door latch 22 on the rear door 6R forms a part of a latch unit 23.

The stopper 40 is an example of an engaging portion of the present application, and includes, as shown in FIGS. 2, 5, 7 to 9, an engaging pin 41 provided to protrude from a position adjacent to and on the rear side of the striker 21 provided to protrude from the side sill upper surface 73b, and as shown in FIGS. 5, 6, and 8, an engaging pin receiving portion 42 that receives the engaging pin 41 brought into the door internal space 6s of the rear door 6R when the door is closed and engages a tip, such as increased diameter portion 41a described later, of the engaging pin 41 at the time of lateral collision of the vehicle.

Specifically, the stopper 40 is configured so that the tip of the engaging pin 41 engages the engaging pin receiving portion 42 as the lower part of the rear door 6R is displaced inward in the vehicle width direction and upward at the time of lateral collision of the vehicle, thereby preventing the rear door 6R from further entering inside in the vehicle width direction or vehicle interior.

As shown in FIGS. 2, 5 to 9, the engaging pin 41 on the side sill 7 includes a cylindrical shaft extending vertically, and the increased diameter portion 41a having a larger diameter than the cylindrical shaft is integrally formed on a tip such as the upper end of the cylindrical shaft. As shown in FIGS. 5, 6, and 8, the engaging pin receiving portion 42 on the rear door 6R forms a part of a pin receiving member 43.

As shown in FIGS. 2, 8, and 9, the striker 21 and the engaging pin 41 are provided on the side sill upper surface 73b via a mounting bracket 30 and adjacent to each other on the front and rear sides of the vehicle.

As shown in FIGS. 6 and 8, the latch unit 23 and the pin receiving member 43 are provided on the door inner panel lower part upper surface 62a via the base plate 50 and the rear door side reinforcing panel 45, hereinafter referred to as reinforcing panel 45, and adjacent to each other on the front and rear sides of the vehicle.

Specifically, the base plate 50 to which the latch unit 23 is mounted is expanded or extended rearward of the vehicle up to the pin receiving member 43, and the pin receiving member 43 is also mounted to the base plate 50. Thus, the latch unit 23 and the pin receiving member 43 are supported on the base plate 50 and integrated or modularized so that they can be together assembled to an upper surface of the reinforcing panel 45.

As shown in FIG. 1, an opening 61a is formed in a region in a front lower part of the door inner panel body 61 and facing the center pillar 60. The latch unit 23 and the pin receiving member 43 together mounted to the base plate 50 are inserted through the opening 61a into the center pillar closed section 60s from the inner side of the door inner panel body 61 in the vehicle width direction, and assembled to the upper surface of the reinforcing panel 45 as shown in FIGS. 3 to 5.

As shown in FIGS. 1 and 3 to 5, a center pillar lower part opening 60a having such a size as to avoid interference with the base plate 50 assembled to the upper surface of the reinforcing panel 45 described above or the latch unit 23 and the pin receiving member 43 integrated with the base plate 50 is formed in an outer wall lower part of the center pillar 60 in the vehicle width direction.

The striker 21 and the engaging pin 41 provided to protrude from the side sill upper surface 73b via the mounting bracket 30 will be described.

As shown in FIG. 8, the mounting bracket 30 extends in the front-rear direction of the vehicle with a length extending over at least the door engaging portion 20 and the stopper 40. As shown in FIGS. 7 and 8, the mounting bracket 30 includes a front mounting portion 31, a middle mounting portion 32, and a rear mounting portion 33 in front, middle, and rear parts in the front-rear direction or longitudinal direction of the vehicle. The mounting portions 31, 32, 33 are formed to be flat so as to be placed on the side sill upper surface 73b, and as shown in FIG. 4, have bolt insertion holes 30h through which bolts B1 or the like can be used to mount the mounting portions 31, 32, 33 to the side sill upper surface 73b. In FIG. 4, only a bolt and a bolt insertion hole for mounting the front mounting portion 31 are shown.

FIG. 7 does not show the side sill outer 73, that is, the side sill upper surface 73b as shown in FIGS. 4 and 8 provided between the mounting bracket 30 and a side sill side reinforcing panel 25 described later.

Further, as shown in FIGS. 7 and 8, the mounting bracket 30 includes a striker seat 34 between the front mounting portion 31 and the middle mounting portion 32 in the front-rear direction of the vehicle, and a pin seat 35 between the middle mounting portion 32 and the rear mounting portion 33, and is generally formed into a substantially M shape in a side view of the vehicle.

As shown in FIG. 8, the striker seat 34 and the pin seat 35 are formed to be raised upward from the mounting portions 31, 32, 33 so that upper surfaces of the striker seat 34 and the pin seat 35 are slightly lower than a lower surface of the door lower wall 62 of the door inner panel 6i of the rear door 6R when the door is closed.

As shown in FIGS. 7 and 9, the striker 21 is provided to protrude from the striker seat 34 by a base 21d of the striker 21 being mounted and supported on an upper surface or seat surface of the striker seat 34 using a mounting member such as a rivet. The engaging pin 41 is provided to protrude from the pin seat 35 by a base 41b of the engaging pin 41 being mounted and supported on an upper surface of the pin seat 35 using a mounting member such as a rivet.

Thus, the striker 21 and the engaging pin 41 are supported on the mounting bracket 30 and integrated so that they can be together assembled to the side sill upper surface 73b.

As shown in FIG. 8, the striker 21 and the engaging pin 41 both have such a height as to protrude upward of the upper surface of the base plate 50 assembled to the door inner panel lower part upper surface 62a when the door is closed.

As shown in FIGS. 4, 7, and 8, the mounting bracket 30 assembled to the side sill upper surface 73b is supported by the side sill side reinforcing panel 25, hereinafter referred to as reinforcing panel 25, provided under the side sill upper surface 73b via the side sill upper surface 73b.

As shown in FIG. 8, the reinforcing panel 25 is mainly provided between the outer upper wall 73b of the side sill outer 73 and the upper wall 72b of the side sill reinforcement 72. As shown in FIG. 7, a raised portion 25a raised upward like a step from a peripheral edge in a plan view is formed at the middle, and an upper surface of the raised portion 25a is formed to be flat so as to abut against the side sill upper surface 73b from below.

As show in FIG. 7, the peripheral edge of the reinforcing panel 25 includes an upper edge flange 25b extending upward from an upper edge of the raised portion 25a, a lower edge flange 25c extending downward from a lower edge, and a front edge flange 25d and a rear edge flange 25e extending forward and rearward from front and rear edges.

As shown in FIGS. 4, 7, and 8, the upper edge flange 25b and the lower edge flange 25c of the reinforcing panel 25 are joined to the upper end flange 72c and the side wall 72a of the side sill reinforcement 72, respectively, from the outer side in the vehicle width direction by spot welding or the like as shown in FIGS. 4 and 7, and the front edge flange 25d and the rear edge flange 25e of the reinforcing panel 25 are joined to the upper wall 72b on the front and rear sides of the raised portion 25a by spot welding or the like as shown in FIGS. 7 and 8.

The raised portion 25a of the reinforcing panel 25 is spaced above the upper wall 72b so as to extend over the upper wall 72b in the vehicle width direction as shown in FIG. 4, and the upper surface of the raised portion 25a abuts against the upper surface of the outer upper wall 73b from the lower side as shown in FIGS. 4 and 8.

Further, as shown in FIG. 4, the front mounting portion 31, the middle mounting portion 32, and the rear mounting portion 33 are fastened to the raised portion 25a of the reinforcing panel 25 so as to hold the outer upper wall 73b therebetween by the bolts B1 or the like. Thus, the raised portion 25a of the reinforcing panel 25 supports the mounting bracket 30 via the outer upper wall 73b as shown in FIGS. 4 and 8.

As shown in FIGS. 5, 6 and 8, the base plate 50 extends in the front-rear direction of the vehicle with the length extending over at least the door engaging portion 20 and the stopper 40. The base plate 50A includes a front mounting portion 51 and a rear mounting portion 52 mounted to the door inner panel lower part upper surface 62a via the reinforcing panel 45 on the front and rear parts, and an inclined seat 53 on which the latch unit 23 and the pin receiving member 43 can be disposed next to each other on the front and rear sides between the front and rear mounting portions 51, 52.

The front mounting portion 51 and the rear mounting portion 52 have bolt insertion holes 50h as shown in FIG. 5 through which bolts B2 or the like can be used to mount the front mounting portion 51 and the rear mounting portion 52 to the reinforcing panel 45.

As shown in FIGS. 6 and 8, the inclined seat 53 is raised upward from the front and rear mounting portions 51, 52, and as shown in FIGS. 5, 6, and 8, a latch unit mounting part 53a to which the latch unit 23 is mounted is formed in a front position of an upper surface of the inclined seat 53.

As shown in FIG. 5, a groove 55 extends through the base plate 50. The groove 55 extends in the vehicle width direction from the latch unit mounting part 53a to the inner end in the vehicle width direction and opens inward in the vehicle width direction correspondingly to an entering trajectory along which the striker 21 is brought into the door internal space 6s of the rear door 6R when the rear door 6R is closed. The groove 55 has a front-to-rear width gradually increasing inward in the vehicle width direction.

As shown in FIGS. 5 and 9, the groove 55 also extends through a bottom surface of a housing 24a of the latch body 24, the reinforcing panel 45, and the door inner panel 6i correspondingly to the entering trajectory along which the striker 21 is brought into the door internal space 6s of the rear door 6R when the rear door 6R is closed.

Thus, as shown in FIGS. 5, 7, and 8, the striker 21 protruding from the mounting bracket 30 provided on the side sill 7 enters the groove 55 from the inner side in the vehicle width direction until the outer cylindrical shaft 21b of the striker 21 reaches a deep part of the groove 55 such as the outer end in the vehicle width direction when the door is closed.

The latch unit 23 includes, as shown in FIGS. 3 to 5 and 8, the latch body 24, and, as shown in FIGS. 3, 4, and 6, a vehicle width inside vertical wall 26 protruding upward, like a vertical wall, from the outer end of the latch body 24 in the vehicle width direction so as to close the center pillar lower part opening 60a as shown in FIGS. 3 to 5 from the inner side in the vehicle width direction.

FIGS. 5 and 8 diagrammatically show an inner structure of the latch body 24.

As shown in FIGS. 5 and 8, the latch body 24 includes the door latch 22 of a fork shape in the plan view, and the housing 24a that houses the door latch 22. As shown in FIG. 5, a base of the door latch 22 is journaled on a shaft 24b swingably between an engagement position P1 and a disengagement position P2 relative to the striker 21 in the plan view.

As shown in FIGS. 5 and 8, the door latch 22 is located at the engagement position P1 when the door is closed, and crosses the groove 55 so as to enter between the cylindrical shafts 21a, 21b on the inner and outer sides of the striker 21 to engage the outer cylindrical shaft 21b of the striker 21 at the deep part of the groove 55 and hold a door closing state.

At this time, as shown in FIG. 8, the coupling shaft 21c of the striker 21 is located above the door latch 22. In this example, a vertical gap dc is ensured between the door latch 22 and the coupling shaft 21c of the striker 21.

The latch unit 23 is coupled to a door handle via a coupling member such as a cable (not shown). As shown in FIG. 5, the door handle is operated so that the door latch 22 pivots from the engagement position P1 to the disengagement position P2 and is disengaged from the striker 21, allowing the rear door 6R to be opened.

The vehicle width inside vertical wall 26 of the latch unit 23 has, in its inner surface in the vehicle width direction, a cable holding portion 26a as shown in FIGS. 4 and 6 that holds a coupling member (not shown) such as a cable extending from the latch body 24 to the door handle (not shown).

As shown in FIGS. 5, 6, and 8, a pin receiving member mounting part 53b to which the pin receiving member 43 is mounted is formed on a rear position of the upper surface of the inclined seat 53.

The pin receiving member 43 includes the flat engaging pin receiving portion 42 at its bottom, and a lower surface of the engaging pin receiving portion 42 is integrally joined to the pin receiving member mounting part 53b of the inclined seat 53.

As shown in FIG. 5, a groove 56 extends through the base plate 50. The groove 56 extends in the vehicle width direction from the pin receiving member mounting part 53b to the inner end in the vehicle width direction and opens inward in the vehicle width direction correspondingly to an entering trajectory along which the engaging pin 41 is brought into or enters the door internal space 6s of the rear door 6R when the rear door 6R is closed. The groove 56 has a front-to-rear width gradually increasing inward in the vehicle width direction.

As shown in FIGS. 5 and 9, the groove 56 also extends through the engaging pin receiving portion 42 of the pin receiving member 43, the reinforcing panel 45, and the door inner panel 6i correspondingly to the entering trajectory along which the engaging pin 41 is brought into the door internal space 6s of the rear door 6R when the rear door 6R is closed.

Thus, as shown in FIGS. 5, 7, and 8, the engaging pin 41 protruding from the mounting bracket 30 provided on the side sill 7 enters the groove 56 from the inner side in the vehicle width direction until the engaging pin 41 reaches a deep part of the groove 56 at the outer end in the vehicle width direction when the door is closed.

As shown in FIGS. 6 to 8, with the engaging pin 41 having entered the deep part of the groove 56 when the door is closed being inserted into the groove 56 from below, the increased diameter portion 41a is located above the upper surface of the engaging pin receiving portion 42. Thus, at the time of lateral collision of the vehicle, the increased diameter portion 41a of the engaging pin 41 engages a peripheral edge at the deep part of the groove 56, that is, the engaging pin receiving portion 42 to prevent the lower part of the rear door 6R from being deformed upward.

As shown in FIGS. 5, 6, and 8, the pin receiving member mounting part 53b of the base plate 50 corresponds to the peripheral edge at the deep part of the groove 56, and the pin receiving member 43 is integrally joined to the pin receiving member mounting part 53b. Thus the flat engaging pin receiving portion 42 surrounds the deep part of the groove 56 in the plan view to reinforce the peripheral edge at the deep part of the groove 56 against a lateral collision load.

As shown in FIG. 8, the vertical space dc between the door latch 22 and the striker 21 is set to be equal to the vertical space dd between the increased diameter portion 41a of the engaging pin 41 and the engaging pin receiving portion 42 when the door is closed.

For example, the coupling shaft 21c of the striker 21 and the door latch 22 ensures the vertical gap therebetween and the increased diameter portion 41a of the engaging pin 41 and the engaging pin receiving portion 42 ensures the vertical gap therebetween when the door is closed. In this example, the vertical spaces dc, dd are set to be equal, i.e., dc=dd, as shown in FIG. 8.

The door engaging portion 20 and the stopper 40 are disposed in an orientation corresponding to an opening/closing trajectory of the rear door 6R.

For example, as shown in FIG. 8, the upper surface of the inclined seat 53 is inclined so that the front side of the vehicle is higher than the rear side of the vehicle in the plan view of the vehicle and the outer side in the vehicle width direction is higher than the inner side in the vehicle width direction in a front view of the vehicle.

Further, as shown in FIGS. 5 and 9, correspondingly to the door opening and closing trajectory, the groove 55 that the striker 21 can enter and the groove 56 that is provided in the lower part of the rear door 6R and that the engaging pin 41 can enter open slightly inclined rearward toward the inner side in the vehicle width direction relative to the vehicle width direction.

Similarly, correspondingly to the door opening and closing trajectory, the striker 21 is supported on the seat surface of the striker seat 34 slightly inclined rearward toward the inner side in the vehicle width direction relative to the vehicle width direction as shown in FIG. 5.

From the above, the striker 21 and the engaging pin 41 can be smoothly guided without interfering with or scraping the latch body 24 and the pin receiving member 43, respectively, when the rear door 6R is opened and closed.

The upper surface of the inclined seat 53 is inclined so that the front side of the vehicle is higher than the rear side of the vehicle in the plan view of the vehicle. As shown in FIGS. 6, 8, and 9, the door lower wall 62 of the door inner panel 6i of the rear door 6R and the reinforcing panel 45 are formed so that an upper surface 45f, hereinafter referred to as step-up portion 45f, on the front side of the latch unit mounting part 53a in the front-rear direction of the vehicle is higher, via a step 45a, than an upper surface 45r, hereinafter referred to as step-down portion 45r, on the rear side of the latch unit mounting part 53a.

The base plate 50 is assembled to the upper surface of the reinforcing panel 45 so that the inclined seat 53 extends over the step 45a.

Further, even with the base plate 50 being assembled to the upper surface of the reinforcing panel 45 so as to extend over the step 45a of the reinforcing panel 45, the front mounting portion 51 and the rear mounting portion 52 are formed to be flat and substantially horizontal so as to be placed in surface contact with the horizontal and flat step-up portion 45f and step-down portion 45r on the upper surface of the reinforcing panel 45 as shown in FIG. 8.

Thus, the base plate 50 that supports the latch unit 23 and the pin receiving member 43 is assembled to the upper surface of the reinforcing panel 45, thereby allowing the latch unit 23 and the pin receiving member 43 to be assembled in the orientation corresponding to the opening and closing trajectory of the rear door 6R without requiring precise adjustment of assembling angles or the like.

The door engaging portion 20 and the stopper 40 are disposed in the front lower part of the door inner panel 6i of the rear door 6R as shown in FIGS. 1 to 9, particularly FIG. 2.

In other words, as shown in FIG. 2, the door engaging portion 20 and the stopper 40 are disposed in positions spaced apart from the door hinge 16 at the rear end of the door inner panel 6i of the rear door 6R as much as possible in the front-rear direction of the vehicle, that is, in the front position of the door inner panel 6i.

Further, in the embodiment shown in FIG. 2, for the door engaging portion 20 and the stopper 40 disposed adjacent to each other in the front-rear direction of the vehicle, the door engaging portion 20 is disposed on the front side of the stopper 40, and thus disposed in a position La>Lb spaced further forward from the door hinge 16 at the rear end of the rear door 6R.

As such, for the door engaging portion 20 and the stopper 40, particularly the door engaging portion 20 is provided on the front side of the rear door 6R as close as possible to a boundary with the front door 6F in the front-rear direction of the vehicle, thereby allowing stable engagement of the door engaging portion 20 and minimizing displacement of the rear door 6R relative to the front door 6F when the door is closed.

As shown in FIGS. 1 to 9, the vehicle side structure of this embodiment described above includes the stopper 40 as an engaging portion that is at least partially provided between the door lower wall 62, being the lower part of the rear door 6R, of the door inner panel 6i of the rear door 6R of the side door 6 and the side sill 7 and provides engagement between the door lower wall 62 and the side sill 7. The stopper 40 includes the engaging pin 41 as shown in FIGS. 2, 7 to 9 provided to protrude from the side sill upper surface 73b, and the engaging pin receiving portion 42 that is provided on the door lower wall 62, receives the engaging pin 41 brought into the door internal space 6s above the door lower wall 62, and engages the increased diameter portion 41a tip of the engaging pin 41 as shown in FIGS. 5, 6, and 8.

According to the above described configuration, the increased diameter portion 41a of the engaging pin 41 provided on the side sill upper surface 73b engages the engaging pin receiving portion 42 provided in the lower part of the rear door 6R at the time of lateral collision of the vehicle, thereby preventing the rear door 6R from entering the vehicle interior.

According to the above described configuration, the engaging pin 41 or the engaging pin receiving portion 42 can be prevented from damaging the side sill upper surface 73b or the lower surface of the door lower wall 62, and the lower surface of the door lower wall 62 of the rear door 6R can be lowered to reduce the height of the side sill 7, for example, the upper flange 7u over which the occupant steps when getting into the vehicle.

Specifically, for example, a conventional engaging portion or stopper not shown) including an engaging pin provided to protrude downward from a door lower surface, and an engaging pin receiving portion provided on a side sill upper surface so as to be engageable with the engaging pin may be configured so that the engaging pin receiving portion provided on the side sill upper surface is introduced or brought into a door lower part when a door is closed and that the engaging pin is received in the engaging pin receiving portion for engagement in the door lower part.

However, such a conventional configuration requires providing, in the door lower part, a space into which the engaging pin receiving portion larger than the engaging pin can be introduced when the door is closed, and also providing the engaging pin protruding downward in the same position as the space, which may provide a complex configuration of the door lower part and hinder formability of a door inner panel.

For example, with the conventional configuration including the engaging pin provided to protrude downward from the door lower surface, and the engaging pin receiving portion that is provided in the side sill upper surface and receives the engaging pin, it is difficult to accommodate a height of the engaging pin receiving portion by introducing the engaging pin receiving portion into the door for engagement between a tip of the engaging pin and the engaging pin receiving portion Thus, a conventional configuration is found in which an engaging pin receiving portion is not introduced into a door when the door is closed, but a gap in which the engaging pin receiving portion is placed is provided between a door lower surface and a side sill upper surface, and the engaging pin receiving portion placed in the gap receives an engaging pin provided to protrude from the door lower surface, such as disclosed, for example, in Japanese Patent Laid-Open No. 2003-11778.

However, in an attempt to engage a tip of the engaging pin with the engaging pin receiving portion in the slight vertical gap between the door lower surface and the side sill upper surface, the engaging pin protruding downward may damage the side sill upper surface or the engaging pin receiving portion provided on the side sill upper surface may damage a side door lower surface when the door is closed.

If a gap between the door lower surface and the side sill upper surface is ensured by increasing a height of the door lower surface, an upper flange or rising portion of the side sill rising that rises from the side sill upper surface on which the engaging pin receiving portion is provided on an inner side in a vehicle width direction or vehicle interior side needs to have a large height so as to close the gap from the inner side in the vehicle width direction. This may prevent the occupant from smoothly stepping over the side sill and getting into the vehicle.

On the other hand, as described above, in an embodiment of the present application, the engaging pin 41 is provided to protrude from the side sill upper surface 73b, and the engaging pin receiving portion 42 is provided in the lower part of the rear door 6R. Thus, the door internal space 6s accommodates the height of the engaging pin receiving portion 42, and the engaging pin 41 brought into the door internal space 6s of the rear door 6R can be received by the engaging pin receiving portion 42 provided on the door inner panel lower part upper surface 62a, that is, on the side of the door internal space 6s of the rear door 6R to provide engagement between the increased diameter portion 41a at the tip of the engaging pin 41 and the engaging pin receiving portion 42.

Thus, according to the above described configuration, the engaging pin receiving portion 42 can be prevented from damaging the side sill upper surface 73b, or the engaging pin 41 can be prevented from damaging the lower surface of the rear door 6R. Also, there is no need to ensure a gap in which the engaging pin receiving portion 42 is disposed between the side sill upper surface 73b and the lower surface of the rear door 6R, and thus the lower surface of the rear door 6R such as the lower surface of the door lower wall 62 can be lowered, thereby reducing the height of the side sill 7 for example, the upper flange 7u over which the occupant steps when getting into the vehicle.

As an aspect of the present application, the striker 21 is provided adjacent to the stopper 40 to protrude from the side sill upper surface 73b as shown in FIGS. 2, 5, 7, and 9, and the latch unit 23 including the door latch 22 that engages the striker 21 when the door is closed is provided in the lower part of the rear door 6R, that is, on the door inner panel lower part upper surface 62a as shown in FIGS. 4 to 6, and 8.

According to the above described configuration, the stopper 40 including the engaging pin 41 and the engaging pin receiving portion 42 and the door engaging portion 20 including the striker 21 and the door latch 22 can be provided adjacent to each other and cooperate to receive a lateral collision load at the time of lateral collision of the vehicle.

As an aspect of the present application, the door engaging portion 2 including the door latch 22 and the striker 21 is provided farther from the door hinge 16 of the rear door 6R than the stopper 40, La>Lb, as shown in FIGS. 1 to 3, particularly FIG. 2.

According to the above described configuration, positioning performance of the rear door 6R can be improved by latch engagement of the door engaging portion 20 when the door is closed.

As an aspect of the present application, the base plate 50 for mounting the latch body 24 partially including the door latch 22 to the door inner panel lower part upper surface 62a is provided as shown in FIGS. 3 to 6, and 8. The base plate 50 is expanded to the engaging pin receiving portion 42, and the engaging pin receiving portion 42 is mounted to the base plate 50 as shown in FIGS. 5, 6, and 8.

According to the above described configuration, the latch body 24 and the engaging pin receiving portion 42 can be mounted to the door inner panel lower part upper surface 62a via the base plate 50 as a common member. This facilitates control of relative heights of the latch body 24 and the engaging pin receiving portion 42, and allows the door latch 22 and the engaging pin receiving portion 42 to behave in the same manner at the time of lateral collision of the vehicle.

As an aspect of the present application, the vertical space dc between the door latch 22 and the striker 21 is set to be equal to the vertical space dd between the engaging pin 41 and the engaging pin receiving portion 42 as shown in FIG. 8.

According to the above described configuration, when the lower part of the rear door 6R moves upward at the time of lateral collision of the vehicle, the door latch 22 can engage the striker 21 and the engaging pin 41 can engage the engaging pin receiving portion 42 at the same timing. Thus, a load can be simultaneously applied to the striker 21 and the engaging pin 41 at the time of lateral collision of the vehicle, and the striker 21 and the engaging pin 41 can cooperate to efficiently receive the lateral collision load.

As described above, for setting the vertical space dc between the door latch 22 and the striker 21 to be equal to the vertical space dd between the engaging pin 41 and the engaging pin receiving portion 42, the engaging pin 41 is provided to protrude from the side sill upper surface 73b, and the engaging pin receiving portion 42 is provided on the door inner panel lower part upper surface 62a so as to receive the engaging pin 41 brought into the door internal space 6s of the rear door 6R to be engageable with the increased diameter portion 41a of the engaging pin 41 when the door is closed. Thus, particularly more remarkably, the engaging pin 41 or the engaging pin receiving portion 42 can be prevented from damaging the side sill upper surface 73b or the lower surface of the door lower wall 62 when the door is closed, and the lower surface of the door lower wall 62 of the rear door 6R can be lowered.

In the conventional configuration in which, for example, the engaging pin is provided to protrude downward from the rear door lower surface, and the engaging pin receiving portion is provided on the side sill upper surface, if, for example, the engaging pin is formed to protrude downward such as toward the side sill so that the gap between the door latch and the striker is set to be equal to the gap between the tip of the engaging pin and the engaging pin receiving portion, the pin may damage the side sill upper surface.

Thus, a position of the engaging pin receiving portion may be raised on the side of the side door.

However, in the conventional configuration in which the engaging pin is provided to protrude downward from the rear door lower surface, and the engaging pin receiving portion is provided on the side sill upper surface, as described above, there is a need to introduce the engaging pin receiving portion into the side door and also to support the pin protruding downward in the same region in the lower part of the side door when the door is closed, which is disadvantageous in terms of formability of the door inner panel or the like. Specifically, simply raising the position of the engaging pin receiving portion on the side of the side door as described above makes it difficult for the inside of the lower part of the side door to accommodate the height of the engaging pin receiving portion when the door is closed.

For raising the position of the engaging pin receiving portion on the side of the side door, the side door lower surface may be raised so as to prevent interference with the side door lower surface. However, in that case, with increasing height of the side door lower surface, the position of the door latch provided in the lower part of the side door becomes higher, and thus the striker provided to protrude from the side sill upper surface needs to be formed to further protrude upward.

The gap between the side door lower surface and the side sill upper surface increases as the height of the striker or the engaging pin receiving portion increases. Thus, as described above, the rising portion or upper flange, which is provided to protrude from the surface of the side sill on which the engaging pin receiving portion is provided, needs to have a larger height so as to close the gap from the inner side in the vehicle width direction being the vehicle interior side. This may prevent the occupant from stepping over the side sill and smoothly getting into the vehicle.

On the other hand, in this embodiment, as described above, for setting the vertical space dc between the door latch 22 and the striker 21 to be equal to the vertical space dd between the engaging pin 41 and the engaging pin receiving portion 42 as shown in FIG. 8, the engaging pin 41 is provided to protrude from the side sill upper surface 73b, and the engaging pin receiving portion 42 is provided on the door inner panel lower part upper surface 62a so as to receive the engaging pin 41 brought into the door internal space 6s of the rear door 6R to be engageable with the increased diameter portion 41a of the engaging pin 41 when the door is closed. Thus, particularly more remarkably, the engaging pin 41 or the engaging pin receiving portion 42 can be prevented from damaging the side sill upper surface 73b or the lower surface of the door lower wall 62 when the door is closed, and the lower surface of the door lower wall 62 of the rear door 6R can be lowered.

The present application is not limited to the configuration of the above described embodiment, but is susceptible of various embodiments.

In the present application, as in the above described embodiment, the stopper 40 and the door engaging portion 20 can be applied between the lower part of the rear door 6R and the side sill 7, but not limited to this, may be applied to the front door 6F or both the doors 6F, 6R.

The engaging portion of the present application is not limited to the stopper 40 that prevents the rear door 6R from entering the vehicle interior at the time of lateral collision of the vehicle as described above, but may include, for example, a configuration in which an engaging pin engages an engaging pin receiving portion to guide and position the rear door 6R to and in a predetermined position relative to the side sill 7 when door is closed, or to ensure support rigidity of the seat belt provided on the side door.

What is claimed is:

1. A vehicle side structure comprising:
    a side door;
    a side sill located below the side door; and
    an engaging portion configured to engage a lower part of the side door and the side sill, the engaging portion including:
        an engaging pin that protrudes upward from an upper surface of the side sill and having a tip with an increased diameter; and
        an engaging pin receiving portion provided in the lower part of the side door and configured to receive the engaging pin brought into a space above the lower part of the side door, the engaging pin receiving portion being configured to receive the engaging pin brought into the space above the lower part of the side door without interference when the door is closed, and to release the engaging pin without interference when the door is opened,
    the tip of the engaging pin configured to engage the engaging pin receiving portion at least at the time of lateral collision.

2. The vehicle side structure according to claim 1, wherein a striker is provided adjacent to the engaging portion and protrudes upward from the upper surface of the side sill, and a door latch is provided in the lower part of the side door, the door latch being configured to engage the striker when the door is closed.

3. The vehicle side structure according to claim 2, wherein a door latch engaging portion including the door latch and the striker is provided farther from a door hinge of the side door than the engaging portion.

4. The vehicle side structure according to claim 2, further comprising a base plate configured for mounting a latch body partially including the door latch to the lower part of the side door, wherein
    the base plate is expanded to the engaging pin receiving portion, and the engaging pin receiving portion is mounted to the base plate.

5. The vehicle side structure according to claim 2, wherein a vertical space between the door latch and the striker is equal to a vertical space between the engaging pin and the engaging pin receiving portion.

* * * * *